US012645275B2

(12) United States Patent　　　　　(10) Patent No.:　US 12,645,275 B2

Turmes　　　　　　　　　　　　　　　(45) Date of Patent:　　Jun. 2, 2026

(54) USING A BACKUP CAPACITOR AS AN ALTERNATE ENERGY SOURCE VIA DYNAMIC APL BUDGETING

(71) Applicant: Micron Technology, Inc., Boise, ID (US)

(72) Inventor: Joseph Louis Turmes, Nampa, ID (US)

(73) Assignee: Micron Technology, Inc., Boise, ID (US)

( * ) Notice:　Subject to any disclaimer, the term of this patent is extended or adjusted under 35 U.S.C. 154(b) by 107 days.

(21) Appl. No.: 18/781,781

(22) Filed:　Jul. 23, 2024

(65)　　　　　Prior Publication Data

US 2025/0123669 A1　　Apr. 17, 2025

Related U.S. Application Data

(60) Provisional application No. 63/591,058, filed on Oct. 17, 2023.

(51) Int. Cl.
　　*G06F 1/00*　　　　(2006.01)
　　*G06F 1/30*　　　　(2006.01)
　　*G06F 11/30*　　　(2006.01)

(52) U.S. Cl.
　　CPC ............ *G06F 1/30* (2013.01); *G06F 11/3034* (2013.01); *G06F 11/3058* (2013.01)

(58) Field of Classification Search
　　CPC .... G06F 1/30; G06F 11/3034; G06F 11/3058; G06F 11/2015; G06F 11/3037; G06F 11/3062
　　See application file for complete search history.

(56)　　　　　References Cited

U.S. PATENT DOCUMENTS

| | | | | |
|---|---|---|---|---|
| 7,107,480 B1 * | 9/2006 | Moshayedi | ......... | G06F 11/1441 |
| | | | | 714/E11.138 |
| 8,301,833 B1 * | 10/2012 | Chen | ...................... | G06F 3/065 |
| | | | | 710/10 |
| 9,036,444 B1 * | 5/2015 | Silberman | ........... | G06F 11/0772 |
| | | | | 365/228 |
| 9,170,887 B2 * | 10/2015 | Nakamura | .............. | G06F 12/00 |
| 10,761,590 B1 * | 9/2020 | Dixon | .................... | G06F 1/3275 |
| 12,436,882 B1 * | 10/2025 | Yang | ................... | G06F 12/0246 |

(Continued)

OTHER PUBLICATIONS

"International Search Report and Written Opinion of the International Searching Authority," issued in connection with Int'l Appl. No. PCT/US2024/040221, dated Nov. 4, 2024 (9 pages).

*Primary Examiner* — Xuxing Chen
(74) *Attorney, Agent, or Firm* — Holland & Hart LLP

(57)　　　　　ABSTRACT

Methods, systems, and devices for using a backup capacitor as an alternate energy source via dynamic APL budgeting are described. A memory system may use excess power available at an energy storage device such as a backup capacitor to improve performance under various circumstances. The amount of power reserved for the APL may be dynamically determined based on various conditions of the memory system. The energy reserved for APL recovery may be dynamically budgeted so that excess energy from the energy storage device may be used to improve operations. The energy storage device may be recharged using surplus power when the amount of energy required for operations at the SSD is less than the maximum power budget for the SSD.

26 Claims, 7 Drawing Sheets

(56) References Cited

U.S. PATENT DOCUMENTS

| | | | |
|---|---|---|---|
| 2009/0235038 A1* | 9/2009 | Sartore ............... | G06F 12/0638 711/E12.103 |
| 2015/0268709 A1* | 9/2015 | Morning-Smith ...... | H02J 7/345 307/64 |
| 2015/0370302 A1 | 12/2015 | Mudusuru et al. | |
| 2016/0202749 A1* | 7/2016 | Milton ................ | G06F 11/1441 713/340 |
| 2020/0301800 A1 | 9/2020 | Majerus et al. | |
| 2022/0083470 A1 | 3/2022 | Jeon et al. | |
| 2023/0161487 A1 | 5/2023 | Lamberts et al. | |
| 2023/0186988 A1 | 6/2023 | Chun et al. | |
| 2026/0000578 A1* | 1/2026 | Van Dyke ............. | A61J 1/2093 |
| 2026/0003571 A1* | 1/2026 | Wu ......................... | G06F 7/483 |

* cited by examiner

105

Host System

Processor 125

Host System Controller 120

115

110

Memory System

PDN 160

Energy storage device 165

Memory System Controller 140

Memory Device 145

Local Controller 150

Memory Array 155

Memory Device 145

Local Controller 150

Memory Array 155

• • •

100

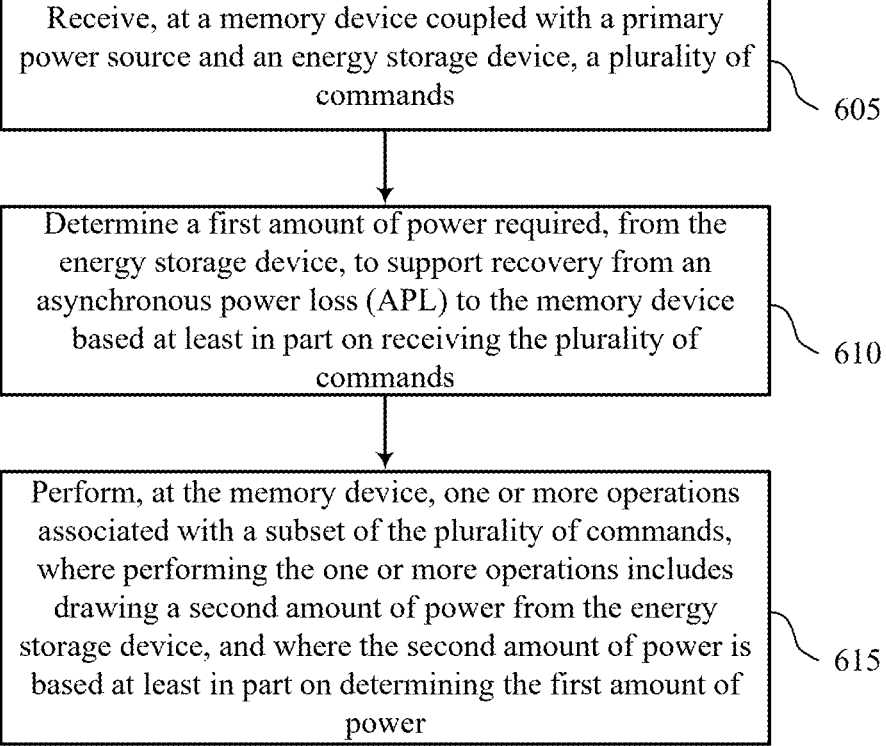

Receive, at a memory device coupled with a primary power source and an energy storage device, a plurality of commands

605

Determine a first amount of power required, from the energy storage device, to support recovery from an asynchronous power loss (APL) to the memory device based at least in part on receiving the plurality of commands

610

Perform, at the memory device, one or more operations associated with a subset of the plurality of commands, where performing the one or more operations includes drawing a second amount of power from the energy storage device, and where the second amount of power is based at least in part on determining the first amount of power

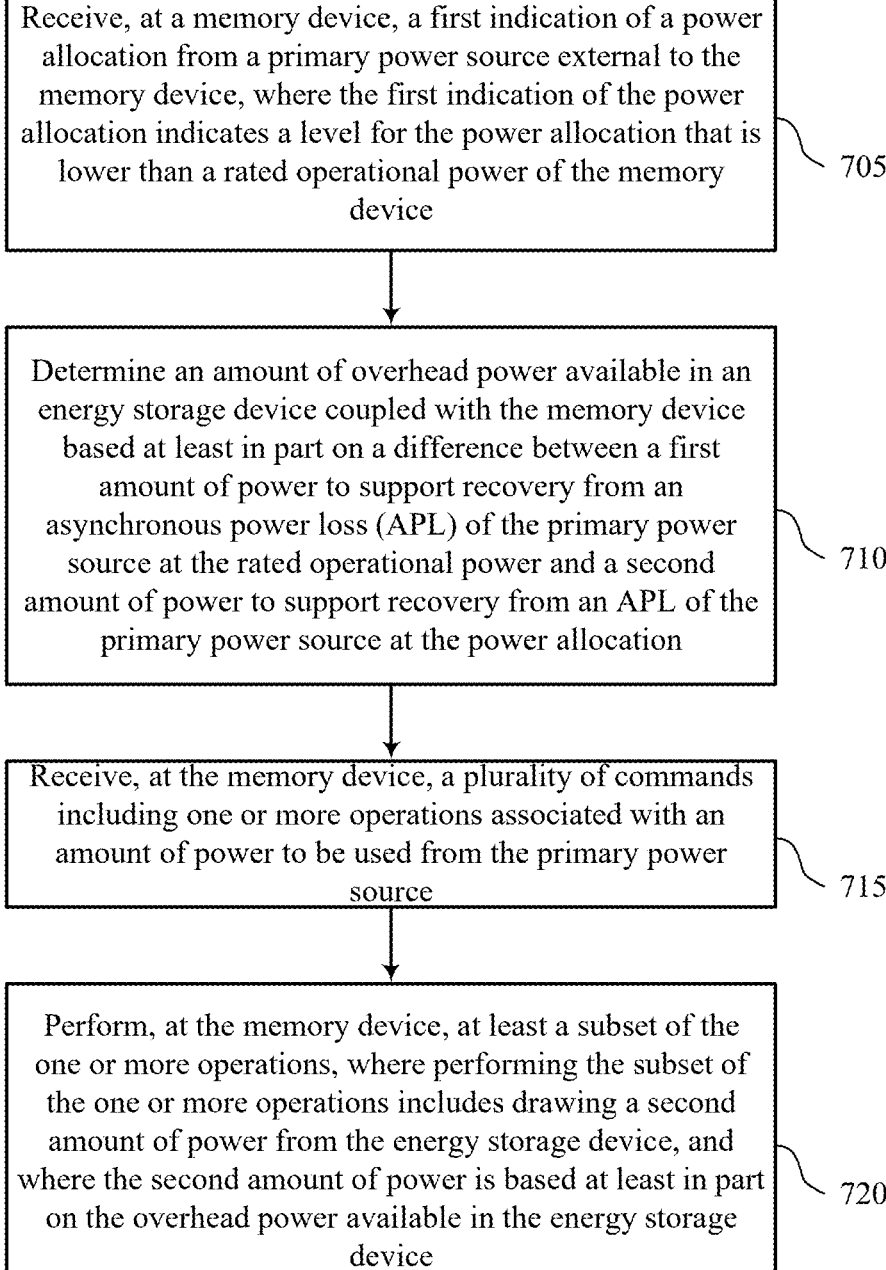

Receive, at a memory device, a first indication of a power allocation from a primary power source external to the memory device, where the first indication of the power allocation indicates a level for the power allocation that is lower than a rated operational power of the memory device

705

Determine an amount of overhead power available in an energy storage device coupled with the memory device based at least in part on a difference between a first amount of power to support recovery from an asynchronous power loss (APL) of the primary power source at the rated operational power and a second amount of power to support recovery from an APL of the primary power source at the power allocation

710

Receive, at the memory device, a plurality of commands including one or more operations associated with an amount of power to be used from the primary power source

715

Perform, at the memory device, at least a subset of the one or more operations, where performing the subset of the one or more operations includes drawing a second amount of power from the energy storage device, and where the second amount of power is based at least in part on the overhead power available in the energy storage device

USING A BACKUP CAPACITOR AS AN ALTERNATE ENERGY SOURCE VIA DYNAMIC APL BUDGETING

CROSS REFERENCE

The present Application for Patent claims priority to U.S. Patent Application No. 63/591,058 by Turmes, entitled "USING A BACKUP CAPACITOR AS AN ALTERNATE ENERGY SOURCE VIA DYNAMIC APL BUDGETING," filed Oct. 17, 2023, which is assigned to the assignee hereof, and which is expressly incorporated by reference in its entirety herein.

TECHNICAL FIELD

The following relates to one or more systems for memory, including using a backup capacitor as an alternate energy source via dynamic asynchronous power loss (APL) budgeting.

BACKGROUND

Memory devices are used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored by the memory cell. To store information, a memory device may write (e.g., program, set, assign) states to the memory cells. To access stored information, a memory device may read (e.g., sense, detect, retrieve, determine) states from the memory cells. Memory systems may include multiple memory devices, where each memory device may have multiple sets of memory cells (e.g., multiple memory banks, multiple memory rows). Maintaining data integrity in memory systems may present challenges due to queuing of commands from a host system.

BRIEF DESCRIPTION OF THE DRAWINGS

FIGS. 6 and 7 show flowcharts illustrating a method or methods that support using a backup capacitor as an alternate energy source via dynamic APL budgeting in accordance with examples as disclosed herein.

DETAILED DESCRIPTION

Figure 1:
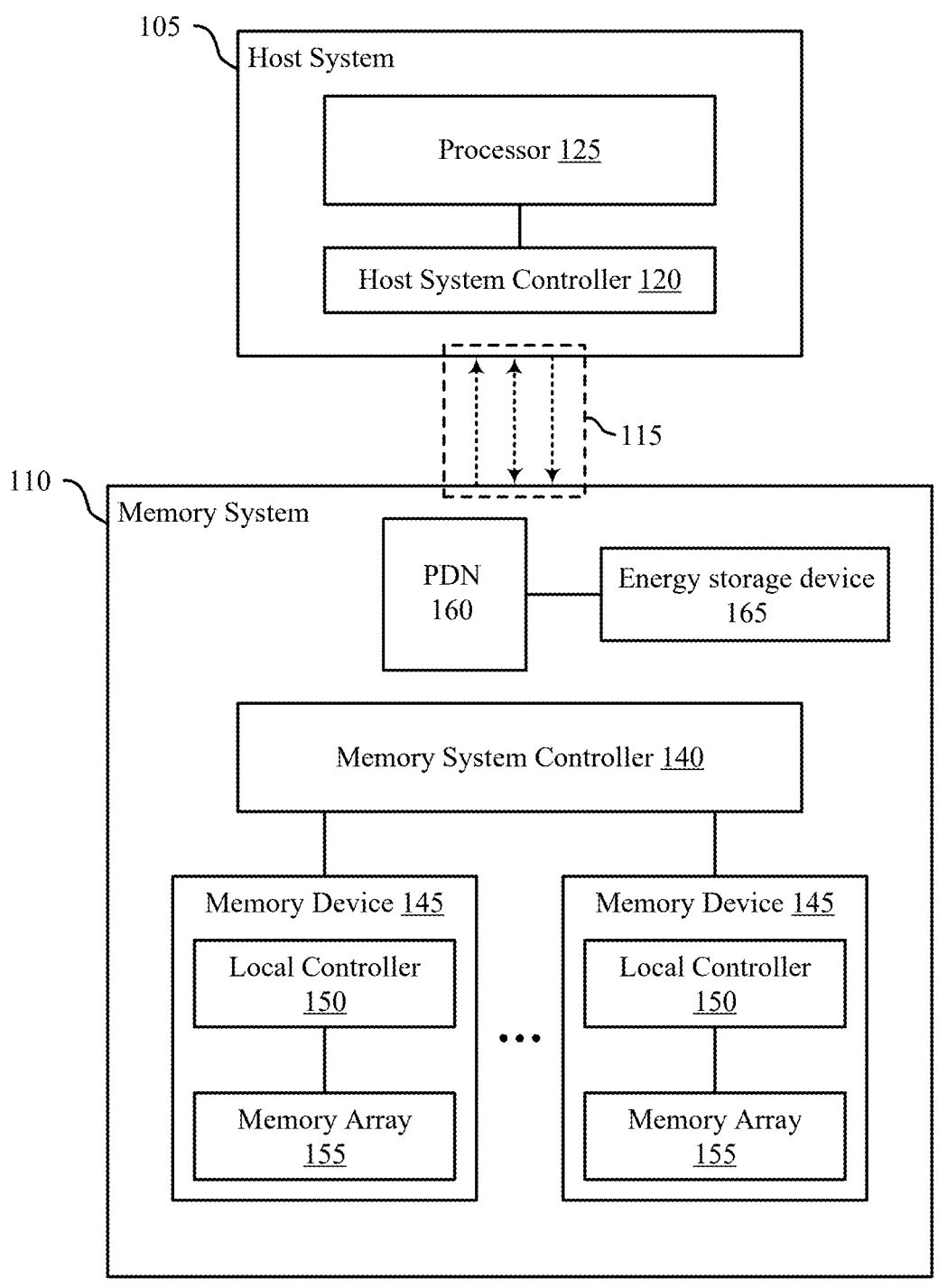
FIG. 1 shows an example of a system that supports using a backup capacitor as an alternate energy source via dynamic asynchronous power loss (APL) budgeting in accordance with examples as disclosed herein.

Memory systems such as solid state drives (SSDs) require a source of power to perform operations associated with commands pending in a command queue. When an unexpected power outage occurs, there is a possibility that some or all commands in the command queue may not be successfully completed. Certain operations associated with the commands pending in the command queue may involve write operations to the memory system. The data associated with such command may be lost if the operations are not completed due to the power outage. Some memory systems (e.g., SSDs) often include an onboard energy storage device (e.g., capacitor or supercapacitor) to provide power in the event of a power outage such as an asynchronous power loss (APL). Power from the energy storage device may be used to complete operations associated with commands in the command queue. In some instances, the amount of power required to complete operations due to APL is lower than the actual storage capacity of the capacitor, thus resulting in excess power being available. In other instances where power allocated or provided to the memory system (e.g., from a primary power source such as a host device) is already at the rated maximum, situations can arise that can cause commands to be delayed due to a lack of allocated power to complete operations associated with the commands. Because the power drawn from the primary power source has a set limit, it is not possible to use more than the set amount of power to assist in cases where commands are being delayed. Furthermore, it is also not possible to use the excess power from the energy storage device to assist when commands are being delayed.

According to the disclosed examples, excess power from the energy storage device may be dynamically reallocated to supplement operations where the memory system has reached its maximum power budget. The memory system may use the excess power available at the energy storage device to improve performance under various circumstances without affecting power reserved for APL recovery (e.g., APL budget). In some examples, the amount of power reserved for the APL may be dynamically determined based on various conditions of the memory system. The conditions may include type of commands currently pending, throughput, background activity, error recovery, temperature, device age, etc. The energy reserved for APL recovery may be dynamically budgeted so that excess energy from the energy storage device may be used to improve performance, QoS, error handling, etc. The excess energy may also be used to reduce or prevent high latency events, perform background tasks, adjust to changes in workload, or reduce peaks in power draw. The energy storage device may be recharged using surplus power when the amount of energy required for operations at the memory system is less than the maximum power budget for the memory system.

Features of the disclosure are illustrated and described in the context of systems and architectures. Features of the disclosure are further illustrated and described in the context of a system that includes an energy storage device with a dynamically variable APL budget and flowcharts.

FIG. 1 illustrates an example of a system 100 that supports using a backup capacitor as an alternate energy source via dynamic APL budgeting in accordance with examples as disclosed herein. The system 100 may include portions of an electronic device, such as a computing device, a mobile computing device, a wireless communications device, a graphics processing device, a vehicle, a smartphone, a wearable device, an internet-connected device, a vehicle controller, a system on a chip (SoC), or other stationary or portable electronic system, among other examples. The system 100 includes a host system 105, a memory system 110, and one or more channels 115 coupling the host system 105 with the memory system 110 (e.g., to support a communicative coupling). The system 100 may include any quantity of one or more memory systems 110 coupled with the host system 105.

The host system 105 may include one or more components (e.g., circuitry, processing circuitry, one or more processing components) that use memory to execute processes, any one or more of which may be referred to as or be included in a processor 125. The processor 125 may include at least one of one or more processing elements that may be co-located or distributed, including a general-purpose processor, a digital signal processor (DSP), an application-specific integrated circuit (ASIC), a field-programmable gate array (FPGA) or other programmable logic device, a controller, discrete gate or transistor logic, one or more discrete hardware components, or a combination thereof. The processor 125 may be an example of a central processing unit (CPU), a graphics processing unit (GPU), a general-purpose GPU (GPGPU), or an SoC or a component thereof, among other examples.

The host system 105 may also include components (e.g., circuitry, logic, instructions) that implement the functions of an external memory controller (e.g., a host system memory controller), which may be referred to as or be included in a host system controller 120. For example, a host system controller 120 may issue commands or other signaling for operating the memory system 110, such as write commands, read commands, configuration signaling or other operational signaling. In some examples, the host system controller 120, or associated functions described herein, may be implemented by or be part of the processor 125. For example, a host system controller 120 may be hardware, instructions (e.g., software, firmware), or some combination thereof implemented by the processor 125 or other component of the host system 105. In various examples, a host system 105 or a host system controller 120 may be referred to as a host.

The memory system 110 provides physical memory locations (e.g., addresses) that may be used or referenced by the system 100. The memory system 110 may include a memory system controller 140 and one or more memory devices 145 (e.g., memory packages, memory dies, memory chips) operable to store data. The memory system 110 may be configurable for operations with different types of host systems 105, and may respond to commands from the host system 105 (e.g., from a host system controller 120). For example, the memory system 110 (e.g., a memory system controller 140) may receive a write command indicating that the memory system 110 is to store data received from the host system 105, or receive a read command indicating that the memory system 110 is to provide data stored in a memory device 145 to the host system 105, or receive a refresh command indicating that the memory system 110 is to refresh data stored in a memory device 145, among other types of commands and operations.

A memory system controller 140 may include components (e.g., circuitry, logic, instructions) operable to control operations of the memory system 110. A memory system controller 140 may include hardware or instructions that support the memory system 110 performing various operations, and may be operable to receive, transmit, or respond to commands, data, or control information related to operations of the memory system 110. A memory system controller 140 may be operable to communicate with one or more of a host system controller 120, one or more memory devices 145, or a processor 125. In some examples, a memory system controller 140 may control operations of the memory system 110 in cooperation with the host system controller 120, a local controller 150 of a memory device 145, or any combination thereof. Although the example of memory system controller 140 is illustrated as a separate component of the memory system 110, in some examples, aspects of the functionality of the memory system 110 may be implemented by a processor 125, a host system controller 120, one or more local controllers 150, or any combination thereof.

Each memory device 145 may include a local controller 150 and one or more memory arrays 155. A memory array 155 may be a collection of memory cells (e.g., a two-dimensional array, a three-dimensional array), with each memory cell being operable to store data (e.g., as one or more stored bits). Each memory array 155 may include memory cells of various architectures, such as random access memory (RAM) cells, dynamic RAM (DRAM) cells, synchronous dynamic RAM (SDRAM) cells, static RAM (SRAM) cells, ferroelectric RAM (FeRAM) cells, magnetic RAM (MRAM) cells, resistive RAM (RRAM) cells, phase change memory (PCM) cells, chalcogenide memory cells, not-or (NOR) memory cells, and not-and (NAND) memory cells, or any combination thereof.

A local controller 150 may include components (e.g., circuitry, logic, instructions) operable to control operations of a memory device 145. In some examples, a local controller 150 may be operable to communicate (e.g., receive or transmit data or commands or both) with a memory system controller 140. In some examples, a memory system 110 may not include a memory system controller 140, and a local controller 150 or a host system controller 120 may perform functions of a memory system controller 140 described herein. In some examples, a local controller 150, or a memory system controller 140, or both may include decoding components operable for accessing addresses of a memory array 155, sense components for sensing states of memory cells of a memory array 155, write components for writing states to memory cells of a memory array 155, or various other components operable for supporting described operations of a memory system 110.

A host system 105 (e.g., a host system controller 120) and a memory system 110 (e.g., a memory system controller 140) may communicate information (e.g., data, commands, control information, configuration information) using one or more channels 115. Each channel 115 may be an example of a transmission medium that carries information, and each channel 115 may include one or more signal paths (e.g., a transmission medium, an electrical conductor, a conductive path) between terminals (e.g., nodes, pins, contacts) associated with the components of the system 100. A terminal may be an example of a conductive input or output point of a device of the system 100, and a terminal may be operable as part of a channel 115. To support communications over channels 115, a host system 105 (e.g., a host system controller 120) and a memory system 110 (e.g., a memory system controller 140) may include receivers (e.g., latches) for receiving signals, transmitters (e.g., drivers) for transmitting signals, decoders for decoding or demodulating received signals, or encoders for encoding or modulating signals to be transmitted, among other components that support signaling over channels 115, which may be included in a respective interface portion of the respective system.

A channel 115 be dedicated to communicating one or more types of information, and channels 115 may include unidirectional channels, bidirectional channels, or both. For example, the channels 115 may include one or more command/address channels, one or more clock signal channels, one or more data channels, among other channels or combinations thereof. In some examples, a channel 115 may be configured to provide power from one system to another (e.g., from the host system 105 to the memory system 110, in accordance with a regulated voltage). In some examples, at least a subset of channels 115 may be configured in accordance with a protocol (e.g., a logical protocol, a communications protocol, an operational protocol, an industry standard), which may support configured operations of and interactions between a host system 105 and a memory system 110.

The memory system 110 may include a power distribution network 160 for managing power used by the memory device 145 to perform various operations, including operations associated with commands received from the host system 105. The power distribution network 160 may receive power from the host system 105, for example, using a subset of the channels 115. An energy storage device 165 may be included in the memory system 110. The energy storage device 165 may be used, for example, as a backup power source for the memory device 145 in the event of an APL. In some examples, the energy storage device 165 may be a supercapacitor. The power distribution network 160 may be used to provide power to energy storage device 165 for use during APL events.

According to the examples described herein, a memory system such as memory system 110 may include an energy storage device capable of being used as an alternate energy source. In some cases, the energy storage device may dynamically allocate energy for APL events and use a remaining portion of its total energy capacity for operations of the memory system 110. The memory system 110 may be coupled with a primary power source associated with the host system 105 as well as the energy storage device. When commands are received at the memory device 145, the amount of power (e.g., a first amount of power) required to support APL events may be determined. Operations associated with some of the received commands may then be performed using power from the energy storage device to supplement the primary power source.

In some examples, the memory device may receive an indication of power allocation from the host system 105. The indication of power may be a value for a power state descriptor (PSD) which indicates a level for the power being allocated to the memory device via the primary power source. An amount of overhead power available in the energy storage device may be determined based on a difference between a first amount of power to support recovery from an APL at the rated operational power for the energy storage device and a second amount of power to support recovery from an APL of the primary power source at the power allocation. A subset of operations associated with commands received at the memory device may be performed by drawing an amount of power from the overhead power available in the energy storage device.

In addition to applicability in systems as described herein, techniques for using a backup capacitor as an alternate energy source via dynamic APL budgeting may be generally implemented to improve the performance (including gaming) of various electronic devices and systems. Some electronic device applications, including gaming and other high-performance applications, may be associated with relatively high processing requirements while also benefitting from relatively quick response times to improve user experience. As such, increasing processing speed, decreasing response times, or otherwise improving the performance electronic devices may be desirable. Implementing the techniques described herein may improve the performance of electronic devices by using the backup capacitor as an alternate energy source to perform operations at the memory device, which may reduce power requirements, decrease processing or latency times, improve response times, or otherwise improve user experience, among other benefits.

Figure 2:
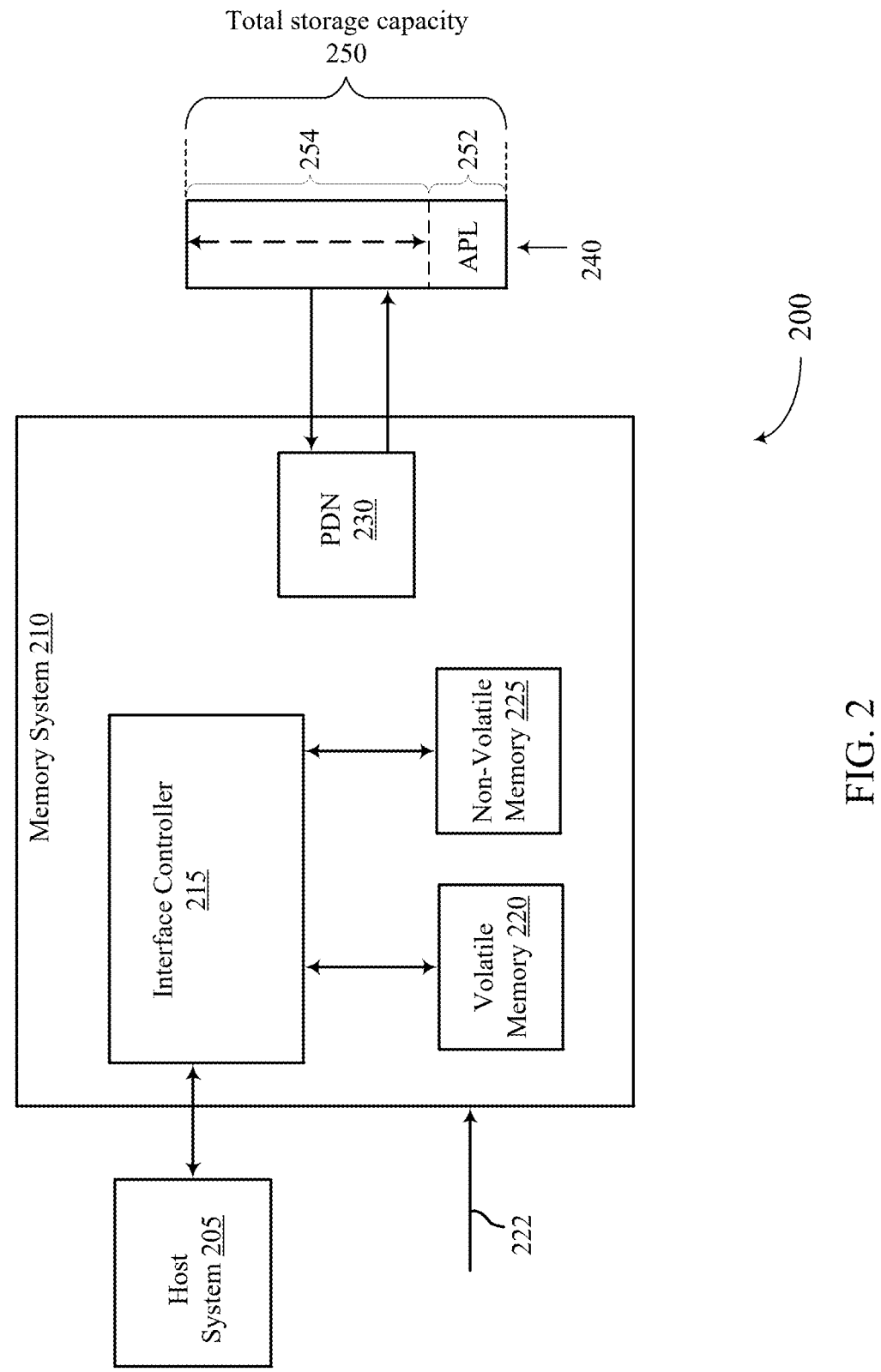
FIG. 2 shows an example of a system that supports using a backup capacitor as an alternate energy source via dynamic APL budgeting in accordance with examples as disclosed herein.

FIG. 2 illustrates an example of a system 200 that supports using a backup capacitor as an alternate energy source via dynamic APL budgeting in accordance with examples as disclosed herein. The system 200 may include a host system 205 and a memory system 210. The host system 205 may be a processor or system-on-a-chip (SoC) that interfaces with an interface controller 215 as well as other components of the electronic device that are included in the system 200. The memory system 210 may store and provide access to information (e.g., data) for the host system 205. The memory system 210 may include an interface controller 215 and one or more memory devices such as a volatile memory 220 or a non-volatile memory 225. In some examples, the interface controller 215, the volatile memory 220, or the non-volatile memory 225 may be disposed on different, respective dies (e.g., silicon dies) of the memory system 210. In some examples, the volatile memory 220 and the non-volatile memory 225 may correspond to memory device 145 and may include a local controller 150 and one or more memory arrays 155. Additionally, each individual memory array 155 may include a collection of memory cells (e.g., a two-dimensional array, a three-dimensional array), with each memory cell being operable to store data (e.g., as one or more stored bits).

According to the examples described herein, the memory system 210 may include a power distribution network (PDN) 230 and an energy storage device 240. The PDN 230 may be configured to distribute power (e.g., by supplying power to one or more voltage supplies) to various components of the memory system 210 such as the volatile memory 220 or non-volatile memory 225, among others. The PDN 230 may receive electrical power via one or more power supply channels such as primary power source 222 (which may be an example of channels 115), and may distribute the power or voltages across the memory system 210. The energy storage device 240 may be coupled with PDN 230 for supplying alternate power to the memory system 210. In some instances, the energy storage device 240 may include a capacitor, a battery, or a combination thereof.

According to the examples described herein, the energy storage device 240 may be used to prevent data corruption during APL events by storing sufficient energy for the memory system 210 to complete data transfers that are in-flight (e.g., pending execution or being executed), thereby allowing safe shutdown of the memory system 210. The energy storage device 240 may be designed and manufactured to include a specific storage capacity based, for example, on the type and size of the memory system 210. In some examples, the PDN 230 may be directly coupled with the energy storage device 240. The PDN 230 may include a charging circuit (not shown) for supplying power to the energy storage device 240 and a discharging circuit (not shown) for receiving power from the energy storage device 240.

The host system 205 may be configured to interface with the memory system 210 using one or more protocols supported by the interface controller 215. In some examples, the host system 205 may interface with the interface controller 215 directly and may interface with the volatile memory 220 or the non-volatile memory 225 indirectly. In other examples, however, the host system 205 may also interface directly with the non-volatile memory 225 or the volatile memory 220. The host system 205 may be or include an SoC, a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components.

The volatile memory 220, the non-volatile memory 225, or both, may include memory cells that are each programmable to store different logic states (e.g., programmed to one of a set of two or more possible states) using an amount of power or energy (e.g., voltage, current, etc.). For example, a memory cell may be programmable to store one bit of information at a time (e.g., a logic 0 or a logic 1). In some examples, a memory cell (e.g., a multi-level memory cell) may be programmable to store more than one bit of information at a time (e.g., a logic 00, logic 01, logic 10, a logic 11). In some examples, the memory cells may be arranged in an array, and may store a charge representative of the programmable states in a capacitor.

The interface controller 215 may be configured to interface with the volatile memory 220 or the non-volatile memory 225 based on or in response to one or more commands or requests issued by the host system 205. For example, the interface controller 215 may facilitate retrieval of data from the volatile memory 220 or the non-volatile memory 225 in response to read commands. The interface controller 215 may also facilitate storage of data in the volatile memory 220 or the non-volatile memory 225 in response to write commands. For example, the host system 205 may initiate a write operation by transmitting a write command to the interface controller 215, and an amount of power may be used to store data associated with the write command in one or more memory cells of the non-volatile memory 225. The host system 205 may also initiate a read operation by transmitting a read command to the interface controller 215, and an amount of power may be used to retrieve the data associated with the read command from one or more memory cells of the non-volatile memory 225. Thus, the interface controller 215 may facilitate data transfer between various subcomponents, such as between one or more of the host system 205, the volatile memory 220, or the non-volatile memory 225.

According to the examples described herein, the host system 205 may communicate an indication of power allocation to the memory system 210. The indication may be a value for a power state descriptor (PSD) which allows the host device to set an attribute for a power limit for the memory system 210 as part a set of attributes. In some examples, the host system 205 may include a power source (e.g., primary power source 222) for supplying the allocated power to the memory system 210. In some examples, the primary power source 222 used to supply power to the memory system 210 may be coupled with the PDN 230. The PSD may have a value selected from a range of values (e.g., PSD0-PSD32) which specify the amount of power allocated to the memory system 210. In some examples, PSD0 may set the highest power level for the memory system 210 and PSD32 may set the lowest power level. In some examples, the highest power level allowed may be 25 W (e.g., PSD0) and the lowest power level allowed may be 8 W (e.g., PSD32).

The PSD attribute corresponds to a level of power that will be available to the memory system 210 until the host system 205 communicates a new PSD attribute. Thus, while the PSD attribute is active, the memory system 210 may be restricted from consuming (e.g., on average) an amount of power that is in excess of the PSD limit. Such restrictions may constrain performance of the memory system 210 because certain commands may be delayed from the host or maintained in the command queue for extended periods until higher priority commands are executed and/or power becomes available. In some instances, the memory system 210 may also require power to perform background operations (e.g., garbage collection, folding, scanning, among others) that are not directly associated with commands received from the host system 205. When the memory system 210 encounters such performance reductions, the amount of data that is to be saved during an APL event may be reduced thereby reducing the amount of energy (e.g., power) required from the energy storage device 240 to complete in-flight operations. The amount of data that is to be saved during an APL event may also increase based on the number of write operations currently pending, thus increasing the amount of energy required from the energy storage device 240 to complete the in-flight operations.

In some examples, a higher PSD attribute (e.g., lower power allocation) may cause a performance decrease which also reduces the backup energy requirements for APL events. Consider an energy storage device 240 that is designed with a capacity of 226 mJ and 111 mJ reserved for APL events. At PSD1, the memory system 210 may be restricted to a power allocation of 20 W and the amount of energy required for APL events may be reduced to 89 mJ (e.g., 20% reduction). Accordingly, up to 137 mJ may be available to the memory system 210 for additional operations.

According to the examples described herein, the amount of energy (e.g., APL budget) required to support recovery from an APL event may be dynamically monitored and adjusted based on the workload associated with the memory system 210 and the amount of power allocated by the host system 205. The energy storage device 240 may be designed to have a storage capacity to recover from APL events under adverse (or worst-case) conditions. For example, such conditions may include, without limitation: workload, throughput, background activity, error recovery, temperature, age, etc. The workload associated with the memory system 210 may require increased energy during an APL event when an increased number of write operations are pending. The throughput level of the memory device may represent the amount of in-process data associated with the memory system 210. Increased throughput scenarios may therefore require additional energy to process during an APL event. The memory system 210 may also be engaged in background activities or maintenance operations (e.g., garbage collection, folding, media scans, etc.) that require an amount of energy from the energy storage device 240 for completion during an APL event. The memory system 210 may also be involved in error recovery operations that are energy intensive and require increased amounts of energy to guarantee data integrity. The temperature of the memory system 210 may also reduce the efficiency of data transfer operations and require additional energy during APL events thereby requiring increased amounts of energy to complete various operations.

In some examples, the age of the memory system 210 may affect the integrity of data and operations, thus requiring increased rates of error recovery and increased energy for APL events. The energy storage device 240 may degrade or become derated over time, thus reducing the total amount of energy that may be stored therein. For example, the energy storage device 240 may be designed for supplying 111 mJ for APL events. The energy storage device 240 may also be designed with a 26% deration value over a period of time, which means it may be designed for at least 140 mJ when initially placed in service. In addition, constraints on component sizes may result in additional storage. Thus, when the energy storage device 240 is initially placed in service, it may have an actual capacity larger than 140 mJ, for example 226 mJ. In this case, approximately 51% (e.g., 115 mJ) of its total capacity may be available for use by the memory system 210 when initially placed in service. Over time due to the deration of the energy storage device, the amount of the total capacity available for use by the memory system (in excess of the APL budge) may be reduced according to the deration schedule of the energy storage device.

As illustrated in FIG. 2, the energy storage device 240 may be designed with a total storage capacity 250 during its manufacturing process. The energy storage device 240 may include an APL budget 252 for supplying energy to recover from APL events and an excess budget 254. According to the examples described herein, the APL budget 252 may be dynamically set based on conditions associated with the memory system 210 as described herein. In some examples, the APL budget 252 and the excess budget 254 may be contiguous until the APL budget 252 is dynamically set for APL recovery based on the state of the memory system 210. Accordingly, the amount of energy allocated to recovery from APL events may vary as indicated by the dashed arrow. In some examples, the amount of energy in the excess budget 254 may be recalculated as the energy storage device 240 ages (e.g., according to the deration of the total storage capacity 250).

According to the examples described, excess energy from the energy storage device 240 may be allocated to perform operations associated with the memory system 210. For example, FIG. 2 illustrates an instance in which the APL budget 252 has been set dynamically set to recover from an APL event. The excess budget 254 may therefore be allocated to perform operations at the memory system 210. In some examples, the power allocation from the host system 205 may be insufficient to perform one or more operations associated with commands received at the memory system 210, certain background activity, error recovery, or a combination thereof. The memory system 210 may therefore access energy corresponding to the excess budget 254 of the energy storage device 240 to perform some or all of these operations. In some examples, energy from the excess budget 254 of the energy storage device 240 may be supplied to the memory system 210 via the PDN 230 using the discharge circuit.

The memory system 210 may periodically perform error recovery operations that consume greater amounts of energy than other operations (e.g., read, write, etc.). In some instances, budgeting power for error recovery operations may reduce power available for other operations, thereby blocking certain operations and resulting in a negative quality of service (QoS). According to the examples described herein, an amount of the energy from the APL budget 252 may be used to assist in performing error recovery. Specifically, the amount of energy available from the energy storage device 240 to perform recovery operations for APL events (e.g., APL budget 252) may account for completion of error recovery operations. Accordingly, the amount of time required to complete the error recovery operation can be reduced and the QoS can be improved by using a portion of the APL budget 252 without adversely affecting APL recovery. In some examples, energy from the APL budget 252 may be used for operations that are blocked due to the current workload of the memory system 210. A read-based test, for example, may require a high amount of power and prevent processing of write commands from the command queue. Power from the APL budget 252 may be allocated to the memory system 210 to perform one or more operations associated with commands (e.g., write commands) pending in the command queue without interrupting the read-based test.

In some examples, operations with higher power requirements may include separate energy allocations from the excess budget 254. For example, a portion of the excess budget 254 may be reserved or prioritized for background scans that may impact performance of the memory system 210. Another portion of the excess budget 254 may be reserved or prioritized for error recovery. In other instances, a portion of the excess budget 254 may be reserved or prioritized to perform operations that are stalled (e.g., pending) due to ongoing operations that are power intensive and/or low power allocations resulting from high PSD attributes. Additionally, portions of the excess budget 254 may be dynamically reserved for such operations based on the status of the memory system 210.

The amount of energy available in the energy storage device 240 may be reduced to a level that only includes the APL budget 252 as a result of the memory system 210 drawing power from the excess budget 254 (e.g., excess energy) to perform one or more operations. Thus, excess energy from may not be available from the excess budget 254 of the energy storage device 240. According to the disclosed some examples, the memory system 210 may recharge the energy storage device 240 based on power allocated from the host system 205. The host system 205 may communicate an indication of power allocation corresponding to PSD0 (e.g., the highest power level). This may correspond to a power allocation of 25 W from the primary power source of the host system 205. In some instances, the memory system 210 may be operating in a state which requires only 20 W to perform operations associated with received commands, maintenance, error correction, among others. According to the disclosed examples, the memory system 210 may recharge the energy storage device 240 using the additional power allocated from the host system 205. Based on the described example, the memory system 210 may use up to 5 W of power to recharge the energy storage device 240. In some examples, the PDN 230 may include a charging circuit for supplying power to the energy storage device 240.

Figure 3:
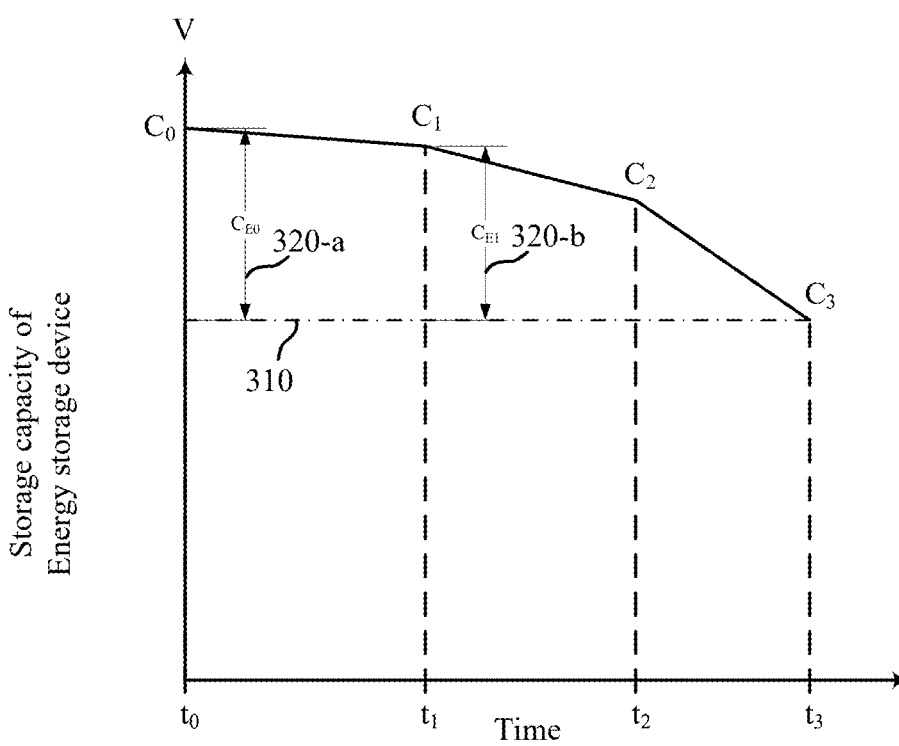
FIG. 3 shows an example plot of storage degradation in a system that supports using a backup capacitor as an alternate energy source via dynamic APL budgeting in accordance with examples as disclosed herein.

FIG. 3 shows an example plot of storage degradation 300 in a system that supports using a backup capacitor as an alternate energy source via dynamic APL budgeting in accordance with examples as disclosed herein. According to the described example, the total storage capacity of the energy storage device 240 may vary over the life of the memory system 210. The energy storage device 240 may include components (e.g., capacitors, batteries, etc.) that are used to store energy. These components may degrade over time, thus reducing the amount of energy that may be stored by the energy storage device 240. The degradation associated with the energy storage device 240 may therefore be factored when determining the APL budget 252 and the excess budget 254.

As shown in FIG. 3, the energy storage device 240 may have capacity of $C_0$ at time t0. This may correspond to a point in time immediately after manufacture or when the memory system 210 is initially placed in service. The memory system 210 may be used for a period of time until $t_1$. During this time, the capacity of the energy storage device 240 may degrade to a value of $C_1$. During a subsequent interval extending to $t_2$, the capacity of the energy storage device 240 may further degrade to a value of $C_2$. At $t_3$, the capacity of the energy storage device 240 may degrade to a value of $C_3$.

In some examples, the first interval (e.g., t0-t1) may be different from the second interval (e.g., t1-t2). Furthermore, the third interval (e.g., t2-t3) may be different from both the first interval and the second interval. In some examples, the capacity of the energy storage device 240 may degrade at a constant rate that may be linear or non-linear over the entire range (e.g., t0-t3). In other examples, the capacity of the energy storage device 240 may degrade at a different rate over each interval.

In some examples, an energy storage device for a memory system may be designed to accommodate the APL at a highest power setting (e.g., PSD0) at an end of life for the memory system (e.g., t3). For example, the energy storage device may be designed to have energy 310 at time t3. According to the examples described herein, an excess capacity CE0 320-$a$ may be available at time t0 and an excess capacity $C_{E1}$ 320-$b$ may be available at time t1, and so on. Degradation associated with energy storage device 240 may be monitored or detected, or may be determined according to a deration schedule. In some examples, the capacity of the energy storage device 240 may be monitored at different intervals in order to make corresponding adjustments the excess capacity CE. The excess capacity may be used for operations such as commands, error recovery operations, background operations, as discussed above.

Figure 4:
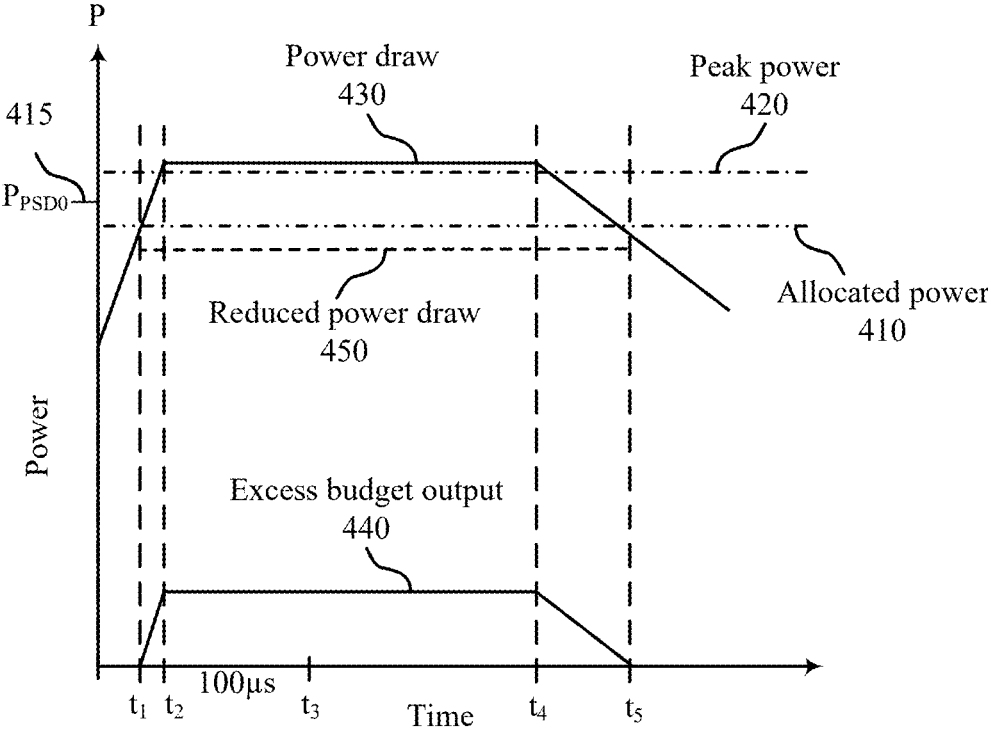
FIG. 4 shows an example plot of peak power reduction in a system that supports using a backup capacitor as an alternate energy source via dynamic APL budgeting in accordance with examples as disclosed herein.

FIG. 4 shows an example plot of peak power reduction 400 in a system that supports using a backup capacitor as an alternate energy source via dynamic APL budgeting in accordance with examples as disclosed herein. As described herein, the PSD may be used to provide an indication of the power allocation for the memory system 210. In some examples, the PSD may have a value ranging from 0-32 where the lowest value corresponds to the highest power allocation. Thus, PSD0 may correspond to the highest power allocation (e.g., 25 W) that is guaranteed by the host system 205, and PSD32 may correspond to the lowest power allocation (e.g., 8 W) that is guaranteed by the host system 205. Furthermore, the power is supplied to the memory system 210 in a sustained manner such that PSD0 limits the memory system from drawing continuously more than 25 W (e.g., on average). In certain instances, the memory system 210 may be allowed to draw an amount of power (e.g., peak power) that is up to 1.5× greater than the allocated power. In such instances, the allocated power may be exceeded for up to a peak power time limit (e.g., 100 μs). Thus, for PSD0 (e.g., 25 W), the memory system 210 may draw up to 37.5 W over a 100 μs period.

Certain operations performed by the memory system 210 may require an average power level that is substantially equal to the allocated power. Such operations, however, may periodically require power that exceeds the allocated power, or exceed the peak power (e.g., 1.5× allocated power) for longer than 100 μs. Such extended periods of peak power may cause interruptions in power from the host system 205 and adversely affect performance of the memory system 210. According to the examples described herein, the energy storage device 240 may be used as a filtering tool to adjust the power variance and reduce the chances of inadvertently exceeding the peak power for longer than 100 μs.

As shown in FIG. 4, the memory system 210 may receive an allocated power 410 from the host system 205. The allocated power 410 may be lower than a power rating of the memory system 210 (e.g., the power $P_{PSD0}$ 415 at PSD0). The memory system 210 may also have an associated peak power 420 corresponding to 1.5× the allocated power 410. Thus, the memory system 210 may not draw an amount of power that exceeds the peak power 420. Furthermore, the memory system 210 may not draw an amount of power that exceeds the allocated power 410 for longer than 100 μs. The power draw 430 for the memory system 210 may reach the allocated power 410 at $t_1$ and increase toward the peak power 420 limit. The power draw 430 for the memory system 210 may continue to increase until $t_2$, at which point the peak power 420 is exceeded. The power draw 430 remains at a constant level until $t_4$ and decreases below the allocated power 410 at $t_5$. As shown in FIG. 4, however, the interval between $t_2$ and $t_3$ represents 100 μs. Thus, the power draw 430 for the memory system 210 is greater than the peak power 420 for the interval between $t_2$ and $t_4$, and has exceeded the allocated power 410 for longer than 100 μs.

According to the examples described herein, a portion of the excess budget 254 from the energy storage device 240 may be used to adjust the power variance from the memory system 210. For example, at $t_1$, the memory system 210 may determine that the power draw 430 has reached the allocated power 410. The energy storage device 240 may supply energy from the excess budget 254 to the memory system 210, as indicated by the excess budget output 440. The energy storage device 240 may supply, or the memory system 210 may draw, an increasing amount of power from the excess budget output 440 until $t_2$. The excess budget output 440 may remain constant until $t_4$ and decrease to an end at $t_5$. The memory system 210 may combine the excess budget output 440 with the power from the primary power source to achieve a reduced power draw 450 from the primary power source. As shown in FIG. 4, the reduced power draw 450 is lower than the allocated power 410 over the entire interval (e.g., $t_1$-$t_5$). Thus, the memory system 210 may be prevented from inadvertently exceeding the peak power 420 or exceeding the allocated power 410 for longer than 100 μs. In some cases, the memory system 210 may use the excess budget output 440 in cases where the power draw 430 does not exceed the peak power 420 limit, or in cases where the power draw 430 does not exceed the allocated power 410 or peak power 420 limit for greater than the peak power time limit. In some cases, an amount of power used for the excess budget output may be based on the dynamic APL budget.

Figure 5:
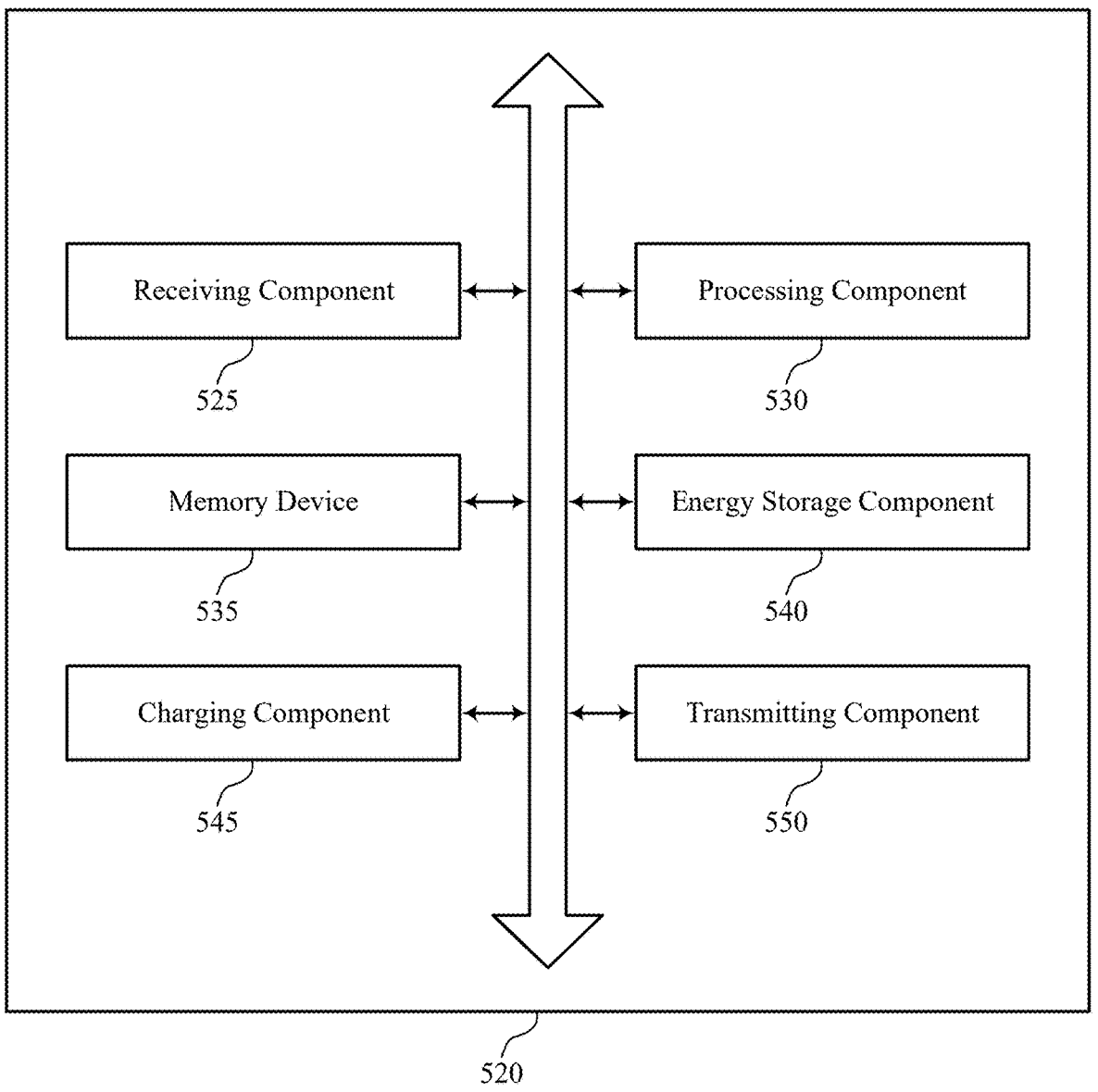
FIG. 5 shows a block diagram of a memory system that supports using a backup capacitor as an alternate energy source via dynamic APL budgeting in accordance with examples as disclosed herein.

FIG. 5 shows a block diagram 500 of a memory system 520 that supports using a backup capacitor as an alternate energy source via dynamic APL budgeting in accordance with examples as disclosed herein. The memory system 520 may be an example of aspects of a Memory system as described with reference to FIGS. 1 through 4. The memory system 520, or various components thereof, may be an example of means for performing various aspects of using a backup capacitor as an alternate energy source via dynamic APL budgeting as described herein. For example, the memory system 520 may include a receiving component 525, a processing component 530, a memory device 535, an energy storage component 540, a charging component 545, a transmitting component 550, or any combination thereof. Each of these components, or components of subcomponents thereof (e.g., one or more processors, one or more memories), may communicate, directly or indirectly, with one another (e.g., via one or more buses).

The receiving component 525 may be configured as or otherwise support a means for receiving, at a memory device coupled with a primary power source and an energy storage device, a plurality of commands. The processing component 530 may be configured as or otherwise support a means for determining a first amount of power required, from the energy storage device, to support recovery from an APL to the memory device based at least in part on receiving the plurality of commands. The memory device 535 may be configured as or otherwise support a means for performing, at the memory device, one or more operations associated with a subset of the plurality of commands, where performing the one or more operations includes drawing a second amount of power from the energy storage device, and where the second amount of power is based at least in part on determining the first amount of power.

In some examples, the energy storage component 540 may be configured as or otherwise support a means for identifying a third amount of power assigned to the energy storage device during a manufacturing process, where the second amount of power is further based on the third amount of power.

In some examples, the processing component 530 may be configured as or otherwise support a means for determining a deration associated with a storage capacity of the energy storage device. In some examples, the processing component 530 may be configured as or otherwise support a means for selecting a fourth amount of power associated with the energy storage device based at least in part on determining the deration associated with a storage capacity of the energy storage device, where the second amount of power is further based on the fourth amount of power.

In some examples, the processing component 530 may be configured as or otherwise support a means for monitoring one or more conditions associated with the memory device, where determining the first amount of power is further based on monitoring the one or more conditions associated with the memory device.

In some examples, the one or more conditions include temperature, power consumption, contents of a command queue, or a combination thereof.

In some examples, the receiving component 525 may be configured as or otherwise support a means for receiving, at the memory device, an indication of a power allocation from the primary power source, where the indication of the power allocation indicates a level for the power allocation. In some examples, the processing component 530 may be configured as or otherwise support a means for determining the level for the power allocation satisfies a threshold associated with an amount of power for operating the memory device. In some examples, the charging component 545 may be configured as or otherwise support a means for charging the energy storage device based at least in part on the level for the power allocation satisfying the threshold.

In some examples, the receiving component 525 may be configured as or otherwise support a means for receiving, at a memory device, a first indication of a power allocation from a primary power source external to the memory device, where the first indication of the power allocation indicates a level for the power allocation that is lower than a rated operational power of the memory device. In some examples, the processing component 530 may be configured as or otherwise support a means for determining an amount of overhead power available in an energy storage device coupled with the memory device based at least in part on a difference between a first amount of power to support recovery from an APL of the primary power source at the rated operational power and a second amount of power to support recovery from an APL of the primary power source at the power allocation. In some examples, the receiving component 525 may be configured as or otherwise support a means for receiving, at the memory device, a plurality of commands including one or more operations associated with an amount of power to be used from the primary power source. In some examples, the memory device 535 may be configured as or otherwise support a means for performing, at the memory device, at least a subset of the one or more operations, where performing the subset of the one or more operations includes drawing a second amount of power from the energy storage device, and where the second amount of power is based at least in part on the overhead power available in the energy storage device.

In some examples, the processing component 530 may be configured as or otherwise support a means for determining a deration associated with a storage capacity of the energy storage device. In some examples, the processing component 530 may be configured as or otherwise support a means for selecting a fourth amount of power associated with the energy storage device based at least in part on determining the deration associated with a storage capacity of the energy storage device, where the second amount of power is further based on the fourth amount of power.

In some examples, the transmitting component 550 may be configured as or otherwise support a means for communicating, by the memory device, a request for a second level for the power allocation based at least in part on an amount of power required to perform the one or more operations associated with the plurality of commands satisfying a threshold. In some examples, the receiving component 525 may be configured as or otherwise support a means for receiving, at the memory device, a second indication of a power allocation from the primary power source based at least in part on communicating the request, where the second indication of a power allocation is different from the first indication of a power allocation.

In some examples, the processing component 530 may be configured as or otherwise support a means for monitoring one or more conditions associated with the memory device, where determining the first amount of power is further based on monitoring the one or more conditions associated with the memory device.

In some examples, the one or more conditions include temperature, power consumption, contents of a command queue, or a combination thereof.

In some examples, the memory device 535 may be configured as or otherwise support a means for determining, at the memory device, an amount of power used to perform the one or more operations of the plurality of commands is less than the level for the power allocation associated with the first indication of power allocation received from the primary power source. In some examples, the charging component 545 may be configured as or otherwise support a means for charging the energy storage device based at least in part on the amount of power used to perform the one or more operations of the plurality of commands being less than the level for the power allocation associated with the first indication of power allocation.

In some examples, the memory device 535 may be configured as or otherwise support a means for detecting, by the memory device, a loss of power from the primary power source. In some examples, the memory device 535 may be configured as or otherwise support a means for completing inflight operations associated with the memory device based at least in part on detecting the loss of power from the primary power source, where completing the inflight operations includes drawing from the first amount of power available from the energy storage device.

In some examples, the inflight operations include one or more of write operations, error correction, garbage collection, and folding.

In some examples, the described functionality of the memory system 520, or various components thereof, may be supported by or may refer to at least a portion of at least one processor, where such at least one processor may include one or more processing elements (e.g., a controller, a microprocessor, a microcontroller, a digital signal processor, a state machine, discrete gate logic, discrete transistor logic, discrete hardware components, or any combination of one or more of such elements). In some examples, the described functionality of the memory system 520, or various components thereof, may be implemented at least in part by instructions (e.g., stored in memory, non-transitory computer-readable medium) executable by such at least one processor.

FIG. 6 shows a flowchart illustrating a method 600 that supports using a backup capacitor as an alternate energy source via dynamic APL budgeting in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 605, the method may include receiving, at a memory device coupled with a primary power source and an energy storage device, a plurality of commands. In some examples, aspects of the operations of 605 may be performed by a receiving component 525 as described with reference to FIG. 5.

At 610, the method may include determining a first amount of power required, from the energy storage device, to support recovery from an asynchronous power loss (APL) to the memory device based at least in part on receiving the plurality of commands. In some examples, aspects of the operations of 610 may be performed by a processing component 530 as described with reference to FIG. 5.

At 615, the method may include performing, at the memory device, one or more operations associated with a subset of the plurality of commands, where performing the one or more operations includes drawing a second amount of power from the energy storage device, and where the second amount of power is based at least in part on determining the first amount of power. In some examples, aspects of the operations of 615 may be performed by a memory device 535 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, at a memory device coupled with a primary power source and an energy storage device, a plurality of commands; determining a first amount of power required, from the energy storage device, to support recovery from an APL to the memory device based at least in part on receiving the plurality of commands; and performing, at the memory device, one or more operations associated with a subset of the plurality of commands, where performing the one or more operations includes drawing a second amount of power from the energy storage device, and where the second amount of power is based at least in part on determining the first amount of power.

Aspect 2: The method, apparatus, or non-transitory computer-readable medium of aspect 1, further including operations, features, circuitry, logic, means, or instructions, or any combination thereof for identifying a third amount of power assigned to the energy storage device during a manufacturing process, where the second amount of power is further based on the third amount of power.

Aspect 3: The method, apparatus, or non-transitory computer-readable medium of any of aspects 1 through 2, further including operations, features, circuitry, logic, means, or instructions, or any combination thereof for determining a deration associated with a storage capacity of the energy storage device and selecting a fourth amount of power associated with the energy storage device based at least in part on determining the deration associated with a storage capacity of the energy storage device, where the second amount of power is further based on the fourth amount of power.

Aspect 4: The method, apparatus, or non-transitory computer-readable medium of any of aspects 1 through 3, further including operations, features, circuitry, logic, means, or instructions, or any combination thereof for monitoring one or more conditions associated with the memory device, where determining the first amount of power is further based on monitoring the one or more conditions associated with the memory device.

Aspect 5: The method, apparatus, or non-transitory computer-readable medium of aspect 4, where the one or more conditions include temperature, power consumption, contents of a command queue, or a combination thereof.

Aspect 6: The method, apparatus, or non-transitory computer-readable medium of any of aspects 1 through 5, further including operations, features, circuitry, logic, means, or instructions, or any combination thereof for receiving, at the memory device, an indication of a power allocation from the primary power source, where the indication of the power allocation indicates a level for the power allocation; determining the level for the power allocation satisfies a threshold associated with an amount of power for operating the memory device; and charging the energy storage device based at least in part on the level for the power allocation satisfying the threshold.

FIG. 7 shows a flowchart illustrating a method 700 that supports using a backup capacitor as an alternate energy source via dynamic APL budgeting in accordance with examples as disclosed herein. The operations of method 700 may be implemented by a memory system or its components as described herein. For example, the operations of method 700 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 705, the method may include receiving, at a memory device, a first indication of a power allocation from a primary power source external to the memory device, where the first indication of the power allocation indicates a level for the power allocation that is lower than a rated operational power of the memory device. In some examples, aspects of the operations of 705 may be performed by a receiving component 525 as described with reference to FIG. 5.

At 710, the method may include determining an amount of overhead power available in an energy storage device coupled with the memory device based at least in part on a difference between a first amount of power to support recovery from an asynchronous power loss (APL) of the primary power source at the rated operational power and a second amount of power to support recovery from an APL of the primary power source at the power allocation. In some examples, aspects of the operations of 710 may be performed by a processing component 530 as described with reference to FIG. 5.

At 715, the method may include receiving, at the memory device, a plurality of commands including one or more operations associated with an amount of power to be used from the primary power source. In some examples, aspects of the operations of 715 may be performed by a receiving component 525 as described with reference to FIG. 5.

At 720, the method may include performing, at the memory device, at least a subset of the one or more operations, where performing the subset of the one or more operations includes drawing a second amount of power from the energy storage device, and where the second amount of power is based at least in part on the overhead power available in the energy storage device. In some examples, aspects of the operations of 720 may be performed by a memory device 535 as described with reference to FIG. 5.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 7: A method, apparatus, or non-transitory computer-readable medium including operations, features, circuitry, logic, means, or instructions, or any combination thereof for receiving, at a memory device, a first indication of a power allocation from a primary power source external to the memory device, where the first indication of the power allocation indicates a level for the power allocation that is lower than a rated operational power of the memory device; determining an amount of overhead power available in an energy storage device coupled with the memory device based at least in part on a difference between a first amount of power to support recovery from an asynchronous power loss (APL) of the primary power source at the rated operational power and a second amount of power to support recovery from an APL of the primary power source at the power allocation; receiving, at the memory device, a plurality of commands including one or more operations associated with an amount of power to be used from the primary power source; and performing, at the memory device, at least a subset of the one or more operations, where performing the subset of the one or more operations includes drawing a second amount of power from the energy storage device, and where the second amount of power is based at least in part on the overhead power available in the energy storage device.

Aspect 8: The method, apparatus, or non-transitory computer-readable medium of aspect 7, further including operations, features, circuitry, logic, means, or instructions, or any combination thereof for determining a deration associated with a storage capacity of the energy storage device and selecting a fourth amount of power associated with the energy storage device based at least in part on determining the deration associated with a storage capacity of the energy storage device, where the second amount of power is further based on the fourth amount of power.

Aspect 9: The method, apparatus, or non-transitory computer-readable medium of any of aspects 7 through 8, further including operations, features, circuitry, logic, means, or instructions, or any combination thereof for communicating, by the memory device, a request for a second level for the power allocation based at least in part on an amount of power required to perform the one or more operations associated with the plurality of commands satisfying a threshold and receiving, at the memory device, a second indication of a power allocation from the primary power source based at least in part on communicating the request, where the second indication of a power allocation is different from the first indication of a power allocation.

Aspect 10: The method, apparatus, or non-transitory computer-readable medium of any of aspects 7 through 9, further including operations, features, circuitry, logic, means, or instructions, or any combination thereof for monitoring one or more conditions associated with the memory device, where determining the first amount of power is further based on monitoring the one or more conditions associated with the memory device.

Aspect 11: The method, apparatus, or non-transitory computer-readable medium of aspect 10, where the one or more conditions include temperature, power consumption, contents of a command queue, or a combination thereof.

Aspect 12: The method, apparatus, or non-transitory computer-readable medium of any of aspects 7 through 11, further including operations, features, circuitry, logic, means, or instructions, or any combination thereof for determining, at the memory device, an amount of power used to perform the one or more operations of the plurality of commands is less than the level for the power allocation associated with the first indication of power allocation received from the primary power source and charging the energy storage device based at least in part on the amount of power used to perform the one or more operations of the plurality of commands being less than the level for the power allocation associated with the first indication of power allocation.

Aspect 13: The method, apparatus, or non-transitory computer-readable medium of any of aspects 7 through 12, further including operations, features, circuitry, logic, means, or instructions, or any combination thereof for detecting, by the memory device, a loss of power from the primary power source and completing inflight operations associated with the memory device based at least in part on detecting the loss of power from the primary power source, where completing the inflight operations includes drawing from the first amount of power available from the energy storage device.

Aspect 14: The method, apparatus, or non-transitory computer-readable medium of aspect 13, where the inflight operations include one or more of write operations, error correction, garbage collection, and folding.

It should be noted that the aspects described herein describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current, voltage) between the components. A conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or may be an indirect conductive path that includes intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component may initiate a change that allows signals to flow between the other components over a conductive path that previously did not permit signals to flow.

A switching component (e.g., a transistor) discussed herein may be a field-effect transistor (FET), and may include a source (e.g., a source terminal), a drain (e.g., a drain terminal), a channel between the source and drain, and a gate (e.g., a gate terminal). A conductivity of the channel may be controlled (e.g., modulated) by applying a voltage to the gate which, in some examples, may result in the channel becoming conductive. A switching component may be an example of an n-type FET or a p-type FET.

The description set forth herein, in connection with the appended drawings, describes example configurations and does not represent all the examples that may be implemented or that are within the scope of the claims. The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Similar components may be distinguished by following the reference label by one or more dashes and additional labeling that distinguishes among the similar components. If just the first reference label is used in the specification, the description is applicable to any one of the similar components having the same first reference label irrespective of the additional reference labels.

The functions described herein may be implemented in hardware, software executed by a processing system (e.g., one or more processors, one or more controllers, control circuitry processing circuitry, logic circuitry), firmware, or any combination thereof. If implemented in software executed by a processing system, the functions may be stored on or transmitted over as one or more instructions (e.g., code) on a computer-readable medium. Due to the nature of software, functions described herein can be implemented using software executed by a processing system, hardware, firmware, hardwiring, or combinations of any of these. Features implementing functions may be physically located at various positions, including being distributed such that portions of functions are implemented at different physical locations.

Illustrative blocks and modules described herein may be implemented or performed with one or more processors, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or other types of processor. A processor may also be implemented as at least one of one or more computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium, or combination of multiple media, that can be accessed by a computer. By way of example, and not limitation, non-transitory computer-readable media can comprise RAM, ROM, electrically erasable programmable read-only memory (EEPROM), optical disk storage, magnetic disk storage or other magnetic storage devices, or any other non-transitory medium or combination of media that can be used to carry or store desired program code means in the form of instructions or data structures and that can be accessed by a computer, or a processor.

The descriptions and drawings are provided to enable a person having ordinary skill in the art to make or use the disclosure. Various modifications to the disclosure will be apparent to the person having ordinary skill in the art, and the techniques disclosed herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
receiving, at a memory system coupled with a primary power source and an energy storage device, a plurality of commands;
determining a first amount of power required, from the energy storage device, to support recovery from an asynchronous power loss (APL) to the memory system based at least in part on receiving the plurality of commands; and
performing, at the memory system, one or more operations associated with a subset of the plurality of commands, wherein performing the one or more operations comprises drawing a second amount of power from the energy storage device, and wherein the second amount of power is based at least in part on determining the first amount of power.

2. The method of claim 1, further comprising:
identifying a third amount of power assigned to the energy storage device during a manufacturing process, wherein the second amount of power is further based on the third amount of power.

3. The method of claim 1, further comprising:
determining a deration associated with a storage capacity of the energy storage device; and
selecting a fourth amount of power associated with the energy storage device based at least in part on determining the deration associated with the storage capacity of the energy storage device, wherein the second amount of power is further based on the fourth amount of power.

4. The method of claim 1, further comprising:
monitoring one or more conditions associated with the memory system, wherein determining the first amount of power is further based on monitoring the one or more conditions associated with the memory system.

5. The method of claim 4, wherein the one or more conditions comprise temperature, power consumption, contents of a command queue, or a combination thereof.

6. The method of claim 1, further comprising:
receiving, at the memory system, an indication of a power allocation from the primary power source, wherein the indication of the power allocation indicates a level for the power allocation;
determining the level for the power allocation satisfies a threshold associated with an amount of power for operating the memory system; and
charging the energy storage device based at least in part on the level for the power allocation satisfying the threshold.

7. A method, comprising:
receiving, at a memory system, a first indication of a power allocation from a primary power source external to the memory system, wherein the first indication of the power allocation indicates a level for the power allocation that is lower than a rated operational power of the memory system;
determining an amount of overhead power available in an energy storage device coupled with the memory system based at least in part on a difference between a first amount of power to support recovery from an asynchronous power loss (APL) of the primary power source at the rated operational power and a second amount of power to support recovery from an APL of the primary power source at the power allocation;
receiving, at the memory system, a plurality of commands comprising one or more operations associated with an amount of power to be used from the primary power source; and
performing, at the memory system, at least a subset of the one or more operations, wherein performing the subset of the one or more operations comprises drawing another amount of power from the energy storage device, and wherein the other amount of power is based at least in part on the overhead power available in the energy storage device.

8. The method of claim 7, further comprising:
determining a deration associated with a storage capacity of the energy storage device; and
selecting a fourth amount of power associated with the energy storage device based at least in part on determining the deration associated with the storage capacity of the energy storage device, wherein the other amount of power is further based on the fourth amount of power.

9. The method of claim 7, further comprising:
communicating, by the memory system, a request for a second level for the power allocation based at least in part on an amount of power required to perform the one or more operations associated with the plurality of commands satisfying a threshold; and
receiving, at the memory system, a second indication of a power allocation from the primary power source based at least in part on communicating the request, wherein the second indication of a power allocation is different from the first indication of a power allocation.

10. The method of claim 7, further comprising:

monitoring one or more conditions associated with the memory system, wherein determining the first amount of power is further based on monitoring the one or more conditions associated with the memory system.

11. The method of claim 10, wherein the one or more conditions comprise temperature, power consumption, contents of a command queue, or a combination thereof.

12. The method of claim 7, further comprising:

determining, at the memory system, an amount of power used to perform the one or more operations of the plurality of commands is less than the level for the power allocation associated with the first indication of power allocation received from the primary power source; and charging the energy storage device based at least in part on the amount of power used to perform the one or more operations of the plurality of commands being less than the level for the power allocation associated with the first indication of power allocation.

13. The method of claim 7, further comprising:

detecting, by the memory system, a loss of power from the primary power source; and completing inflight operations associated with the memory system based at least in part on detecting the loss of power from the primary power source, wherein completing the inflight operations comprises drawing from the first amount of power available from the energy storage device.

14. The method of claim 13, wherein the inflight operations comprise one or more of write operations, error correction, garbage collection, and folding.

15. A memory system, comprising:

one or more memory devices; and one or more controllers coupled with the one or more memory devices, the one or more controllers configured to cause the memory system to:

receive, at the memory system coupled with a primary power source and an energy storage device, a plurality of commands;

determine a first amount of power required, from the energy storage device, to support recovery from an asynchronous power loss (APL) to the memory system based at least in part on receiving the plurality of commands; and perform one or more operations associated with a subset of the plurality of commands, wherein performing the one or more operations comprises drawing a second amount of power from the energy storage device, and wherein the second amount of power is based at least in part on determining the first amount of power.

16. The memory system of claim 15, wherein the one or more controllers are further configured to cause the memory system to:

identify a third amount of power assigned to the energy storage device during a manufacturing process, wherein the second amount of power is further based on the third amount of power.

17. The memory system of claim 15, wherein the one or more controllers are further configured to cause the memory system to:

determine a deration associated with a storage capacity of the energy storage device; and select a fourth amount of power associated with the energy storage device based at least in part on determining the deration associated with a storage capacity of the energy storage device, wherein the second amount of power is further based on the fourth amount of power.

18. The memory system of claim 15, wherein the one or more controllers are further configured to cause the memory system to:

monitor one or more conditions associated with the memory system, wherein determining the first amount of power is further based on monitoring the one or more conditions associated with the memory system.

19. The memory system of claim 18, wherein the one or more conditions comprise temperature, power consumption, contents of a command queue, or a combination thereof.

20. The memory system of claim 15, wherein the one or more controllers are further configured to cause the memory system to:

receive an indication of a power allocation from the primary power source, wherein the indication of the power allocation indicates a level for the power allocation;

determine the level for the power allocation satisfies a threshold associated with an amount of power for operating the memory system; and charge the energy storage device based at least in part on the level for the power allocation satisfying the threshold.

21. A memory system, comprising:

one or more memory devices; and one or more controllers coupled with the one or more memory devices, the one or more controllers configured to cause the memory system to:

receive a first indication of a power allocation from a primary power source external to the memory system, wherein the first indication of the power allocation indicates a level for the power allocation that is lower than a rated operational power of the memory system;

determine an amount of overhead power available in an energy storage device coupled with the memory system based at least in part on a difference between a first amount of power to support recovery from an asynchronous power loss (APL) of the primary power source at the rated operational power and a second amount of power to support recovery from an APL of the primary power source at the power allocation;

receive a plurality of commands comprising one or more operations associated with an amount of power to be used from the primary power source; and perform at least a subset of the one or more operations, wherein performing the subset of the one or more operations comprises drawing another amount of power from the energy storage device, and wherein the other amount of power is based at least in part on the overhead power available in the energy storage device.

22. The memory system of claim 21, wherein the one or more controllers are further configured to cause the memory system to:

determine a deration associated with a storage capacity of the energy storage device; and select a fourth amount of power associated with the energy storage device based at least in part on determining the deration associated with the storage capacity of the energy storage device, wherein the other amount of power is further based on the fourth amount of power.

23. The memory system of claim 21, wherein the one or more controllers are further configured to cause the memory system to:

communicate a request for a second level for the power allocation based at least in part on an amount of power required to perform the one or more operations associated with the plurality of commands satisfying a threshold; and receive a second indication of a power allocation from the primary power source based at least in part on communicating the request, wherein the second indication of a power allocation is different from the first indication of a power allocation.

24. The memory system of claim 21, wherein the one or more controllers are further configured to cause the memory system to:

monitor one or more conditions associated with the memory system, wherein determining the first amount of power is further based on monitoring the one or more conditions associated with the memory system.

25. The memory system of claim 21, wherein the one or more controllers are further configured to cause the memory system to:

determine an amount of power used to perform the one or more operations of the plurality of commands is less than the level for the power allocation associated with the first indication of power allocation received from the primary power source; and charge the energy storage device based at least in part on the amount of power used to perform the one or more operations of the plurality of commands being less than the level for the power allocation associated with the first indication of power allocation.

26. The memory system of claim 21, wherein the one or more controllers are further configured to cause the memory system to:

detect a loss of power from the primary power source; and complete inflight operations associated with the memory system based at least in part on detecting the loss of power from the primary power source, wherein completing the inflight operations comprises drawing from the first amount of power available from the energy storage device.

* * * * *